US012627624B2

(12) United States Patent
Ishikawa

(10) Patent No.: US 12,627,624 B2
(45) Date of Patent: May 12, 2026

(54) DETECTION APPARATUS, DETECTION METHOD, AND DETECTION PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Fumiya Ishikawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 55 days.

(21) Appl. No.: 18/704,314

(22) PCT Filed: Oct. 13, 2022

(86) PCT No.: PCT/JP2022/038213

§ 371 (c)(1),
(2) Date: Apr. 24, 2024

(87) PCT Pub. No.: WO2023/074393

PCT Pub. Date: May 4, 2023

(65) Prior Publication Data

US 2024/0388552 A1     Nov. 21, 2024

(30) Foreign Application Priority Data

Oct. 26, 2021    (JP) ................................. 2021-174792

(51) Int. Cl.
*H04L 51/212*     (2022.01)
*H04L 67/12*     (2022.01)

(52) U.S. Cl.
CPC ............ *H04L 51/212* (2022.05); *H04L 67/12* (2013.01)

(58) Field of Classification Search
CPC .............................. H04L 51/212; H04L 67/12
See application file for complete search history.

(56) References Cited

U.S. PATENT DOCUMENTS 11,949,705 B2 *   4/2024   Haga .................... G07C 5/0808
2016/0381068 A1 *   12/2016   Galula ................ G07C 5/0816
                                      726/23

(Continued)

OTHER PUBLICATIONS

SCIS2016 [USB] SCIS2016 2016 Symposium Cryptography and Information Security, Jan. 22, 2016 p. 1-8.

(Continued)

*Primary Examiner* — David R Lazaro
(74) *Attorney, Agent, or Firm* — Brooks Kushman P.C.

(57) ABSTRACT

A detection apparatus detects an improper message on a vehicle-mounted network mounted in a vehicle. The detection apparatus includes: a message acquisition unit that acquires a transmission message on the vehicle-mounted network; and a determination unit that performs a determination relating to improper messages on the vehicle-mounted network by performing a determination on the transmission message acquired by the message acquisition unit. The determination unit is capable of outputting a second determination result relating to the transmission message in addition to a first determination result indicating whether or not the transmission message acquired by the message acquisition unit is an improper message.

14 Claims, 5 Drawing Sheets

(56)                References Cited

U.S. PATENT DOCUMENTS

| 2017/0013005 A1 * | 1/2017 | Galula ................. H04L 63/1425 |
| 2018/0255082 A1 * | 9/2018 | Ostergaard ............. G06N 20/00 |
| 2019/0044912 A1 * | 2/2019 | Yang ....................... G06F 21/50 |
| 2019/0141074 A1 * | 5/2019 | Oka ......................... H04L 43/50 |
| 2019/0367041 A1 * | 12/2019 | Nakano ................. G06F 21/554 |
| 2019/0391596 A1 * | 12/2019 | Beauvillain ...... G08G 1/096741 |
| 2020/0145433 A1 * | 5/2020 | Gutierrez ............. G06N 3/0985 |
| 2020/0213340 A1 | 7/2020 | Hamada |
| 2021/0056206 A1 * | 2/2021 | Hirano .................. G06F 21/566 |
| 2021/0067967 A1 * | 3/2021 | Arzelier .............. H04L 63/0823 |
| 2021/0281986 A1 * | 9/2021 | Zhu .......................... H04W 4/40 |
| 2022/0242419 A1 * | 8/2022 | Davidovich ........ B60W 40/105 |
| 2022/0407880 A1 * | 12/2022 | Rosadini .................. H04L 12/12 |
| 2023/0205181 A1 * | 6/2023 | Kishikawa ........... G05D 1/0038 |
| | | 701/2 |
| 2023/0244785 A1 * | 8/2023 | Rosadini ................. H04L 12/40 |
| | | 726/23 |
| 2024/0388552 A1 * | 11/2024 | Ishikawa ................. H04L 67/12 |

OTHER PUBLICATIONS

International Search Report, Application No. PCT/JP2022/038213, mailed Nov. 22, 2024. ISA/Japan Patent Office.

* cited by examiner

DETECTION APPARATUS, DETECTION METHOD, AND DETECTION PROGRAM

CROSS-REFERENCE TO RELATED APPLICATIONS

This application is the U.S. national stage of PCT/JP2022/038213 filed on Oct. 13, 2022, which claims priority of Japanese Patent Application No. JP 2021-174792 filed on Oct. 26, 2021, the contents of which are incorporated herein.

TECHNICAL FIELD

The present disclosure relates to a detection apparatus, a detection method, and a detection program.

BACKGROUND

JP2019-29961A discloses the impropriety detection method described below. That is, in an impropriety detection method used by a monitoring electronic control unit, which is connected to a network, on a vehicle-mounted network system, using impropriety detection rule information indicating a first condition, which is a condition for a relationship between the respective contents of a frame with a first identifier and a frame with a second identifier, whether or not a group of frames received from a network satisfies the first condition is determined, using impropriety detection rule information indicating a second condition, which is a condition for a relationship between the respective contents of a frame with the first identifier and a frame with a third identifier, whether or not a group of frames received from the network satisfies the second condition is determined, an abnormality level relating to transmission of a first type of frame is calculated according to the number of conditions determined as not being satisfied, and a predetermined frame is transmitted according to the calculated abnormality level.

Vehicle-mounted network systems have been developed in the past to improve the security of vehicle-mounted networks.

When determining whether or not a message transmitted from a vehicle-mounted apparatus on a vehicle-mounted network is an improper message according to data values and the like included in the message, it is possible to conceive of cases where it is difficult to make a clear judgment.

The present disclosure was conceived to solve the issues described above, and it is an object of the present disclosure to provide a detection apparatus, a detection method, and a detection program that can more accurately detect improper messages on a vehicle-mounted network.

SUMMARY

A detection apparatus according to an aspect of the present disclosure is a detection apparatus for detecting an improper message on a vehicle-mounted network mounted in a vehicle, the detection apparatus including: a message acquisition unit configured to acquire a transmission message on the vehicle-mounted network; and a determination unit configured to perform a determination relating to improper messages on the vehicle-mounted network by performing a determination on the transmission message acquired by the message acquisition unit, wherein the determination unit is capable of outputting a second determination result relating to the transmission message in addition to a first determination result indicating whether or not the transmission message acquired by the message acquisition unit is an improper message.

A detection method according to an aspect of the present disclosure is a detection method for a detection apparatus that detects an improper message on a vehicle-mounted network mounted in a vehicle, the detection method including: a step of acquiring a transmission message on the vehicle-mounted network; and a step of performing a determination relating to improper messages on the vehicle-mounted network by performing a determination on the acquired transmission message, wherein the determination relating to improper messages is capable of outputting a second determination result relating to the transmission message in addition to a first determination result indicating whether or not the acquired transmission message is an improper message.

A detection program according to an aspect of the present disclosure is a detection program used in a detection apparatus that detects an improper message on a vehicle-mounted network mounted in a vehicle, the program causing a computer to function as: a message acquisition unit configured to acquire a transmission message on the vehicle-mounted network; and a determination unit configured to perform a determination relating to improper messages on the vehicle-mounted network by performing a determination on the transmission message acquired by the message acquisition unit, wherein the determination unit is capable of outputting a second determination result relating to the transmission message in addition to a first determination result indicating whether or not the transmission message acquired by the message acquisition unit is an improper message.

The above aspects of the present disclosure may be realized not only as a detection apparatus equipped the characteristic processing unit described above, but may also be realized as a semiconductor integrated circuit that realizes part or all of a detection apparatus and may be realized as a vehicle-mounted communication system including a detection apparatus.

Advantageous Effects

According to the present disclosure, it is possible to more accurately detect improper messages on a vehicle-mounted network.

DETAILED DESCRIPTION OF PREFERRED EMBODIMENTS

Figure 1:
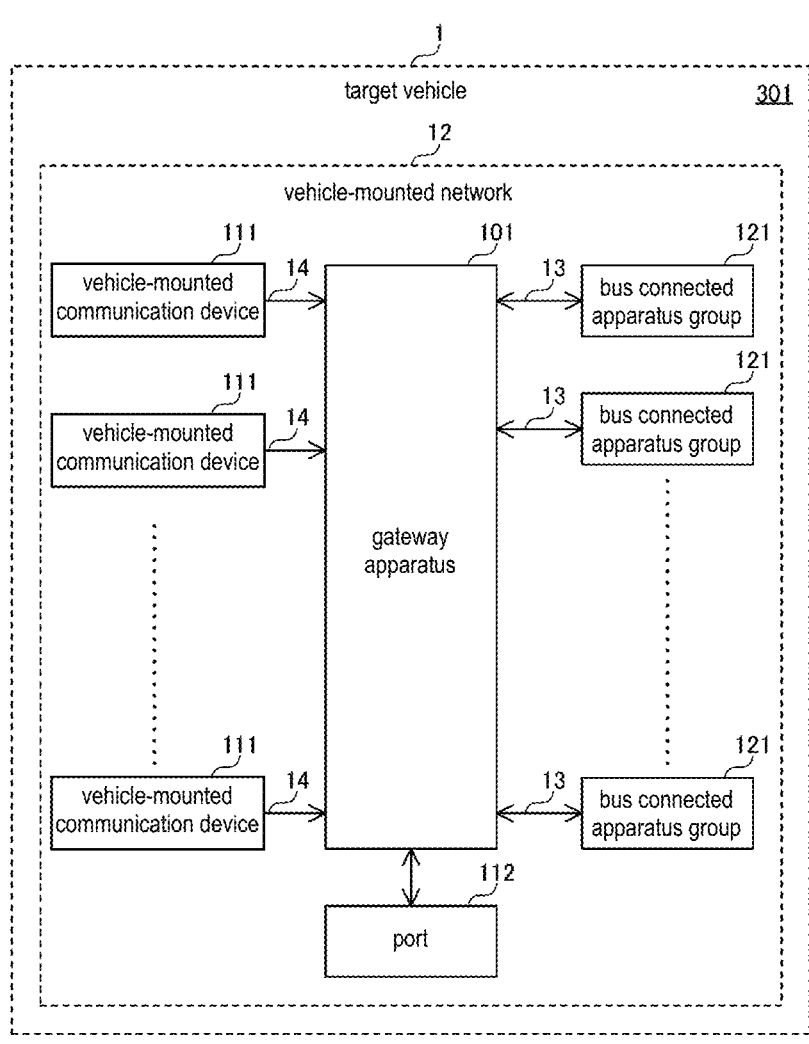
FIG. 1 depicts the configuration of a vehicle-mounted communication system according to an embodiment of the present disclosure.

Several embodiments of the present disclosure will first be listed and described in outline.

A detection apparatus according to an embodiment of the present disclosure is a detection apparatus for detecting an improper message on a vehicle-mounted network mounted in a vehicle, the detection apparatus including: a message acquisition unit configured to acquire a transmission message on the vehicle-mounted network; and a determination unit configured to perform a determination relating to improper messages on the vehicle-mounted network by performing a determination on the transmission message acquired by the message acquisition unit, wherein the determination unit is capable of outputting a second determination result relating to the transmission message in addition to a first determination result indicating whether or not the transmission message acquired by the message acquisition unit is an improper message.

With the configuration described above, as one example, it is possible to output a second determination result when making a determination for a transmission message for which it is difficult to clearly determine whether or not the message is an improper message. This makes it possible to prevent erroneous determinations of whether or not a transmission message is an improper message. Accordingly, improper messages on a vehicle-mounted network can be detected more accurately.

The determination unit may perform respectively different processing relating to the transmission message when the first determination result has been outputted and when the second determination result has been outputted.

With the configuration described above, as one example, generation and the like of log data can be performed for transmission messages for which a clear determination relating to improper messages is possible, and for transmission messages for which a clear determination relating to improper messages is difficult, more appropriate processing can be performed depending on the determination result, such as suspending the generation of log data.

The determination unit may calculate a statistical value for the second determination result and determine whether or not an improper message is present based on the calculated statistical value.

With the above configuration, it is possible to obtain a more accurate determination result that statistically takes into consideration second determination results that have been outputted a plurality of times, such as the number of times the second determination result has been outputted in a certain period of time.

The second determination result may include a plurality of types of determination result, and the determination unit may perform weighting in keeping with the types when calculating the statistical value.

With the configuration described above, as one example, it is possible to output, as the second determination result, a determination result of a type corresponding to the probability that the transmission message being judged is an improper message, which makes it possible to obtain even more accurate determination results.

When the second determination result has been outputted, the determination unit may generate log data indicating that the second determination result has been outputted.

With the configuration described above, it is possible to perform separate analysis and the like for a transmission message for which it is difficult to clearly determine whether or not the transmission message is an improper message.

When the second determination result has been outputted as a first determination, the determination unit may perform a second determination with a different content on another transmission message that differs to the transmission message subjected to the first determination, and may determine whether or not an improper message is present based on a determination result of the second determination.

In this way, by using a configuration where a first determination and a second determination with respectively different contents are both performed, it is possible to improve the detection performance for improper messages.

The transmission message subjected to the first determination and the other transmission message subjected to the second determination may indicate different types of measurement result relating to the vehicle.

With the configuration described above, it is possible to avoid erroneous determinations caused by an abnormality at a single meter or the like, which makes it possible to obtain a more accurate determination result about whether or not an improper message is present.

The transmission message subjected to the first determination may indicate a measurement result for a vehicle speed of the vehicle, and the determination unit may change a determination criterion for the second determination in keeping with whether or not the measurement result for the vehicle speed satisfies a predetermined condition.

Here, it is common for the measurement result of the vehicle's engine rotation speed, the steering angle, the accelerator opening, the body acceleration, or the like for when the vehicle is traveling at low speed and the measurement result for when the vehicle is traveling at high speed to exhibit different tendencies.

This means that by using the above configuration, it is possible to use a more appropriate determination criterion in the second determination that takes into consideration the tendency for measurement results related to a vehicle to change depending on the vehicle speed of the vehicle, and by doing so, it is possible to obtain a more accurate determination result of whether or not an improper message is present.

The transmission message acquired by the message acquisition unit may indicate a measurement result for a vehicle speed of the vehicle, the detection apparatus may further include a storage unit for storing a normal vehicle speed, which is a measurement result of vehicle speed during normal operation when no improper message is present, and a first threshold and a second threshold that are in a magnitude-based relationship determined based on the normal vehicle speed, and the determination unit may compare a difference between a measurement result for the vehicle speed indicated by the transmission message and the normal vehicle speed with the first threshold and the second threshold and output the first determination result or the second determination result in keeping with a comparison result.

With the above configuration, it is possible to easily grasp the difference relative to the state of the vehicle during normal operation, which facilitates determinations relating to improper messages.

The storage unit may further store a third threshold that is larger than the first threshold and smaller than the second threshold, the determination unit may output the second determination result when the difference is larger than the first threshold and equal to or less than the second threshold, and upon outputting the second determination result, the determination unit may subject the transmission message to a determination relating to improper messages using the third threshold stored in the storage unit.

In this way, by using a configuration where a detailed determination is performed using the third threshold when the second determination result has been outputted, it is possible to obtain a more accurate determination result.

The detection apparatus may further include a counter, and the determination unit may change a countup value of the counter in keeping with a magnitude-based relationship between the difference and the first threshold, the second threshold, and the third threshold and perform a determination relating to improper messages using a count value of the counter.

With the above configuration, as one example, since it is possible to reflect, in the count value, the difference between the measured result for vehicle speed of the vehicle indicated by the transmission message and the normal vehicle speed, that is, the probability that the transmission message is an improper message, it is possible to obtain an even more accurate determination result.

The determination unit determines that an improper message may be present when the count value of the counter is equal to or higher than a predetermined value, and the predetermined value may be larger than a highest value out of a plurality of countup values of the counter.

With the above configuration, outputting of the second determination result a plurality of times is one condition for obtaining a determination result that an improper message is present, which makes it possible to obtain a more accurate determination result.

The transmission message that is subjected to the first determination may indicate a measurement result for a vehicle speed of the vehicle, the transmission message that is subjected to the second determination may indicate a measurement result for an engine rotation speed of the vehicle, the detection apparatus may further include a storage unit for storing a normal engine rotation speed, which is a measurement result of the engine rotation speed during normal operation when no improper message is present, and a fourth threshold that is determined based on the normal engine rotation speed, and in the second determination, the determination unit may compare a difference between a measurement result of the engine rotation speed indicated by the transmission message and the normal engine rotation speed with the fourth threshold.

According to this configuration, it is possible to prevent erroneous determinations due to an abnormality at a sensor that measures the vehicle speed, and to obtain a more accurate determination result of whether or not an improper message is present. It is also possible to easily grasp the difference relative to the state of the vehicle during normal operation, which facilitates determinations relating to improper messages.

A detection method according to an aspect of the present disclosure is a detection method for a detection apparatus that detects an improper message on a vehicle-mounted network mounted in a vehicle, the detection method including: a step of acquiring a transmission message on the vehicle-mounted network; and a step of performing a determination relating to improper messages on the vehicle-mounted network by performing a determination on the acquired transmission message, wherein the determination relating to improper messages is capable of outputting a second determination result relating to the transmission message in addition to a first determination result indicating whether or not the acquired transmission message is an improper message.

According to the method described above, it is possible to output a second determination result when making a determination for a transmission message for which it is difficult to clearly determine whether or not the message is an improper message, for example. This makes it possible to prevent erroneous determinations of whether or not a transmission message is an improper message. Accordingly, improper messages on a vehicle-mounted network can be detected more accurately.

A detection program according to an aspect of the present disclosure is a detection program used in a detection apparatus that detects an improper message on a vehicle-mounted network mounted in a vehicle, the program causing a computer to function as: a message acquisition unit configured to acquire a transmission message on the vehicle-mounted network; and a determination unit configured to perform a determination relating to improper messages on the vehicle-mounted network by performing a determination on the transmission message acquired by the message acquisition unit, wherein the determination unit is capable of outputting a second determination result relating to the transmission message in addition to a first determination result indicating whether or not the transmission message acquired by the message acquisition unit is an improper message.

With the configuration described above, it is possible to output a second determination result when making a determination for a transmission message for which it is difficult to clearly determine whether or not the message is an improper message, for example. This makes it possible to prevent erroneous determinations of whether or not a transmission message is an improper message. Accordingly, improper messages on a vehicle-mounted network can be detected more accurately.

Embodiments of the present disclosure will now be described with reference to the attached drawings. Note that identical or corresponding parts in the drawings have been assigned the same reference numerals and description thereof is not repeated. In addition, at least some parts of the embodiments described below may be freely combined.

Configuration and Basic Operation

Overall Structure

FIG. 1 depicts the configuration of a vehicle-mounted communication system according to an embodiment of the present disclosure. As depicted in FIG. 1, a vehicle-mounted communication system 301 includes a gateway apparatus (or "detection apparatus") 101, a plurality of vehicle-mounted communication devices 111, and a plurality of bus connected apparatus groups 121.

Figure 2:
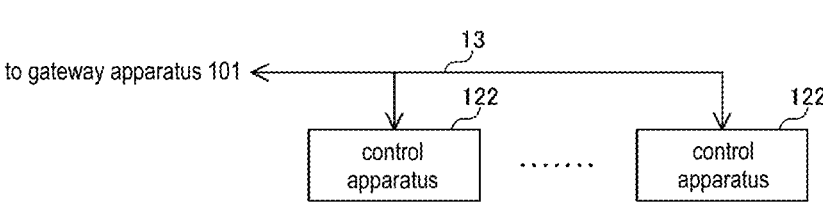
FIG. 2 depicts the configuration of a bus-connected apparatus group according to an embodiment of the present disclosure.

FIG. 2 depicts the configuration of a bus-connected apparatus group according to an embodiment of the present disclosure. As depicted in FIG. 2, the bus-connected apparatus group 121 includes a plurality of control apparatuses 122. Note that a bus-connected apparatus group 121 is not limited to a configuration including a plurality of control apparatuses 122, and may be configured so as to include one control apparatus 122.

As depicted in FIG. 1, a vehicle-mounted communication system 301 is installed in a vehicle (hereinafter also referred to as a target vehicle) 1 that travels on a road. A vehicle-mounted network 12 includes a plurality of vehicle-mounted apparatuses, which are apparatuses provided inside the target vehicle 1. In more detail, the vehicle-mounted network 12 includes a plurality of vehicle-mounted communication devices 111, which are examples of "vehicle-mounted apparatuses", and the plurality of control apparatuses 122 depicted in FIG. 2.

Note that so long as the vehicle-mounted network 12 includes a plurality of vehicle-mounted apparatuses, the vehicle-mounted network 12 may be configured to include a plurality of vehicle-mounted communication devices 111 without including a control apparatus 122, may be configured to include a plurality of control apparatuses 122 without including a vehicle-mounted communication device 111, or may be configured to include one vehicle-mounted communication device 111 and one control apparatus 122.

In the vehicle-mounted network 12, each vehicle-mounted communication device 111 communicates with an apparatus outside the target vehicle 1, for example. As specific examples, the in-vehicle communication devices 111 are a TCU (Telematics Communication Unit), a short-range wireless terminal apparatus, and an ITS (Intelligent Transport Systems) wireless device.

As examples, the gateway apparatus 101 is capable of transmitting and receiving data such as firmware updates, data accumulated by the gateway apparatus 101, and the like via a port 112 to an external device located outside the target vehicle 1.

As one example, the gateway apparatus 101 is a central gateway (CGW), and is connected to vehicle-mounted apparatuses via buses 13 and 14. In more detail, the buses 13 and 14 are buses that conform to standards such as CAN (Controller Area Network) (registered trademark), FlexRay (registered trademark), MOST (Media Oriented Systems Transport) (registered trademark), Ethernet (registered trademark), and LIN (Local Interconnect Network).

As one example, the vehicle-mounted communication devices 111 are connected to the gateway apparatus 101 via a corresponding bus 14 that conforms to the Ethernet standard. As another example, each control apparatus 122 in the bus-connected apparatus group 121 is connected to the gateway apparatus 101 via a corresponding bus 13 that conforms to the CAN standard. The control apparatuses 122 can control functional equipment in the target vehicle 1, such as instruments, the engine, and the brakes.

Note that the bus 13 is not limited to a configuration to which the control apparatuses 122 are connected, and apparatuses aside from the control apparatuses 122, such as sensors, may also be connected.

The gateway apparatus 101 performs relay processing to relay information exchanged between the control apparatuses 122 connected to different buses 13 in the target vehicle 1, information exchanged between the vehicle-mounted communication devices 111, and information exchanged between the control apparatuses 122 and the vehicle-mounted communication devices 111, for example.

In more detail, in the target vehicle 1, messages are periodically transmitted from one vehicle-mounted apparatus to another vehicle-mounted apparatus according to a predetermined protocol for example. Messages may be transmitted as a broadcast or a unicast. Hereinafter, messages that are periodically transmitted are also referred to as "periodic messages".

In the target vehicle 1, aside from the periodic messages, there are also messages that are irregularly transmitted from one control apparatus 122 to another control apparatus 122. These messages includes an ID for identifying the content of the message, the transmitter of the message, and the like. Based on this ID, it is possible to identify whether or not a message is a periodic message.

Although messages transmitted from one control apparatus 122 to another control apparatus 122 are described below, the same applies to messages transmitted between a control apparatus 122 and a vehicle-mounted communication device 111 and messages transmitted between respective vehicle-mounted communication devices 111.

Configuration of Gateway Apparatus

Figure 3:
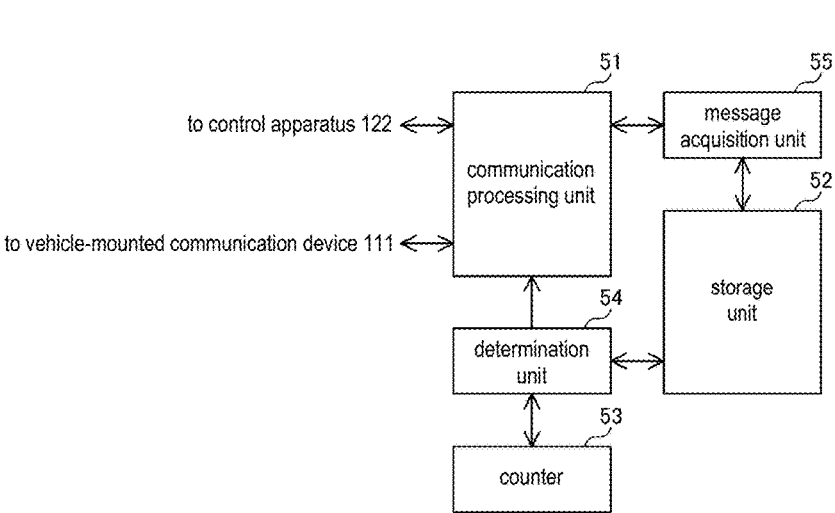
FIG. 3 depicts the configuration of a gateway apparatus in the vehicle-mounted communication system according to an embodiment of the present disclosure.

FIG. 3 depicts the configuration of the gateway apparatus in the vehicle-mounted communication system according to an embodiment of the present disclosure. As depicted in FIG. 3, the gateway apparatus 101 functions as a detection apparatus in an IDS (Intrusion Detection System), and detects improper messages in the vehicle-mounted network 12 installed in the target vehicle 1.

In more detail, the gateway apparatus 101 includes a communication processing unit 51, a storage unit 52, a counter 53, a determination unit 54, and a message acquisition unit 55. As one example, the communication processing unit 51, the determination unit 54, and the message acquisition unit 55 are realized by processors such as a CPU (Central Processing Unit) and a DSP (Digital Signal Processor). The storage unit 52 is a nonvolatile memory, for example.

When the communication processing unit 51 has received a message from one control apparatus 122 via the corresponding bus 13, the communication processing unit 51 performs relay processing that transmits the received message to another control apparatus 122 via the corresponding bus 13.

In more detail, upon receiving a message from one control apparatus 122, as one example and as described later, the communication processing unit 51 holds the message and stands by until an instruction that permits relay processing of the message is received from the message acquisition unit 55 or the determination unit 54. After this, when the communication processing unit 51 has received an instruction that permits relay processing of the message from the message acquisition unit 55 or the determination unit 54, the communication processing unit 51 performs the relay processing of the message.

The message acquisition unit 55 acquires a transmission message on the vehicle-mounted network 12, that is, a message to be subjected to relay processing by the communication processing unit 51, and stores the acquired message in the storage unit 52.

In more detail, detection condition information indicating the types of data to be used to detect improper messages on the vehicle-mounted network 12 is registered in the storage unit 52. As examples, such types of data include measurement results for engine speed, vehicle speed, yaw rate, steering angle, accelerator opening, vehicle body acceleration, and the like. This detection condition information will be described in detail later.

The message acquisition unit 55 refers to the detection condition information registered in the storage unit 52 and recognizes the types of data to be monitored by the message acquisition unit 55 itself. The message acquisition unit 55 then monitors the data included in the messages to be relayed by the communication processing unit 51 and every time a message including data of a type to be monitored is detected, acquires the detected message from the communication processing unit 51. The message acquisition unit 55 then attaches a time stamp indicating the reception time of the message to the acquired message, and stores the message with the attached time stamp in the storage unit 52.

If the message held by the communication processing unit 51 does not include a type of data to be monitored, as one example, the message acquisition unit 55 instructs the communication processing unit 51 to permit relay processing of the message.

In addition to the types of data used to detect improper messages, the detection condition information registered in the storage unit 52 also indicates determination criteria and the like for determining, for each type of data, whether or not a message including such data is an improper message.

As a specific example, the detection condition information indicates that the type of data to be used to detect an improper message is vehicle speed and indicates a threshold to be used as a determination criterion for determining whether or not a message including data indicating the vehicle speed is an improper message. The threshold that serves as the determination criterion is decided in advance based for example, on a measurement result of the vehicle speed in a normal state when no improper message is present on the vehicle-mounted network 12.

The determination unit 54 performs a determination relating to improper messages on the vehicle-mounted network 12 through determinations performed on messages acquired by the message acquisition unit 55. In more detail, the determination unit 54 acquires data included in a message stored in the storage unit 52 by the message acquisition unit 55. The determination unit 54 then determines, based on the acquired data, for example, whether or not the message including the data is an improper message.

As one example, when it has been determined that a message is not an improper message, the determination unit 54 instructs the communication processing unit 51 to permit relay processing of the message.

Description of Issue to be Addressed

Figure 4:
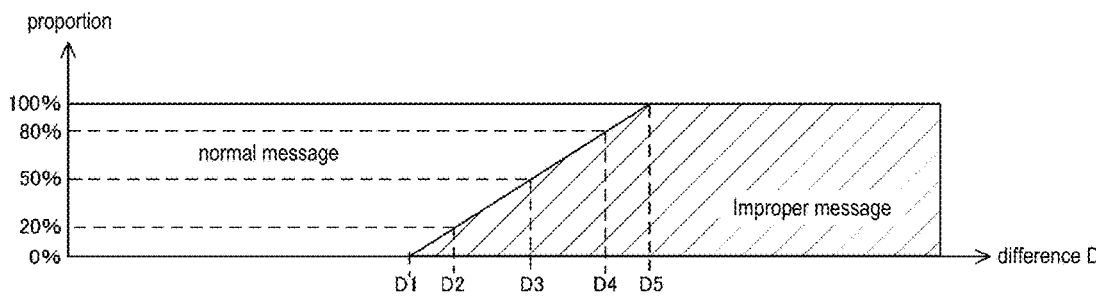
FIG. 4 is a diagram for describing an issue to be addressed when detecting improper messages on a vehicle-mounted network.

FIG. 4 is a diagram for describing an issue to be addressed when detecting improper messages on a vehicle-mounted network. Here, it is assumed that a message indicating a vehicle speed (hereinafter also referred to as a "vehicle speed message") is the message subjected to this determination (hereinafter the "message being judged"). The horizontal axis of the graph depicted in FIG. 4 indicates a difference D from a normal vehicle speed, and the vertical axis indicates examples of calculation results for the ratios of normal messages and improper messages included in a plurality of messages indicating vehicle speed. The vehicle speed during normal operation may be the average value of the vehicle speed when the target vehicle 1 is traveling under normal operation, for example.

As depicted in FIG. 4, in a plurality of vehicle speed messages regarding which the difference D is in a range of 0<D<D1, 100% are normal messages. In a plurality of vehicle speed messages regarding which the difference D is D=D2 (>D1), 80% are normal messages and 20% are improper messages.

In a plurality of vehicle speed messages regarding which the difference D is D=D3 (>D2), 50% are normal messages and 50% are improper messages. In a plurality of vehicle speed messages regarding which the difference D is D=D4 (>D3), 20% are normal messages and 80% are improper messages. In a plurality of vehicle speed messages regarding which the difference D is D>D5 (>D4), 100% are improper messages.

In this way, if the difference D between the vehicle speed indicated by a message being judged and the normal vehicle speed is within the range of D1 to D5, the message has the possibility of being both a normal message and an improper message, which means that it is difficult to clearly judge whether or not a message is an improper message and an erroneous determination may be made. In particular, the closer the difference D is to D3, the more difficult it is to judge whether or not the message is an improper message, and the higher the risk of an erroneous determination being made. For this reason, the detection apparatus according to an embodiment of the present disclosure solves this issue by using the following configuration and operation.

Flow of Operations for Determining Improper Messages by the Determination Unit Overall Flow of Operations Each apparatus in the vehicle-mounted communication system 301 is equipped with a computer including a memory, and a computation processing unit such as a CPU in the computer reads a program, which includes some or all steps in the following flowchart, from the memory and executes the program. The programs used in this plurality of apparatuses can be installed from outside. The programs of this plurality of apparatuses are distributed having been stored on recording media.

Figure 5:
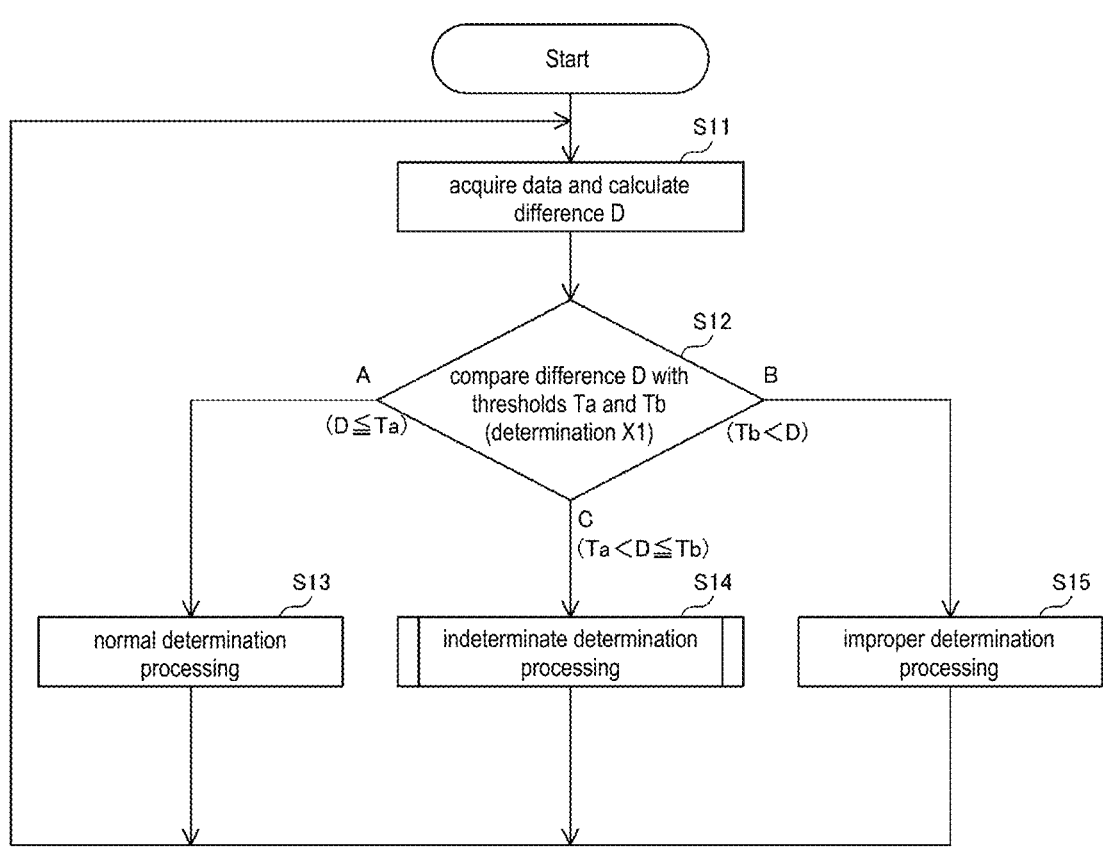
FIG. 5 is a flowchart outlining the operation procedure for determining an improper message by a determination unit in the detection apparatus according to an embodiment of the present disclosure.

FIG. 5 is a flowchart outlining the operation procedure for determining an improper message by the determination unit in the detection apparatus according to an embodiment of the present disclosure.

Here, it is assumed that messages indicating vehicle speed are the messages being judged. It is also assumed that detection condition information indicating the vehicle speed in a normal state and thresholds for the difference D from the vehicle speed in the normal state is registered in the storage unit 52. As one example, assume that two thresholds, Ta (or the "first threshold") and Tb (or the "second threshold") that are in a magnitude-based relationship are stored as thresholds. The magnitude-based relationship between these two thresholds Ta and Tb is Ta<Tb.

As depicted in FIG. 5, first, when a message to be judged that was acquired by the message acquisition unit 55 has been newly stored in the storage unit 52, the determination unit 54 acquires the data included in this newly stored message. The determination unit 54 then calculates the difference D between the vehicle speed indicated by the acquired data and the normal vehicle speed stored in the storage unit 52 (step S11).

Next, the determination unit 54 performs determination X1 that compares the calculated difference D with two thresholds Ta and Tb stored in the storage unit 52 and outputs a determination result of a type corresponding to the comparison result (step S12).

In the determination X1, the determination unit 54 is capable of outputting a second determination result, which relates to the message, in addition to a first determination result indicating whether or not the message including the acquired data is an improper message.

In more detail, if the calculated difference D is equal to or less than the threshold Ta (that is, D≤Ta) ("A" in step S12), the determination unit 54 outputs, as the first determination result, a determination result A indicating that the message is a normal message. When the calculated difference D is larger than the threshold Tb (that is, Tb<D) ("B" in step S12), the determination unit 54 outputs, as the first determination result, a determination result B indicating that the message is an improper message.

If the calculated difference D is larger than the threshold Ta and equal to or less than the threshold Tb (that is, Ta<D≤Tb) ("C" in step S12), the determination unit 54 outputs, as the second determination result, a determination result C indicating that the message is a message for which it is not possible to clearly determine whether the message is a normal message or an improper message (hereinafter, also referred to as an "indeterminate message").

Next, the determination unit 54 performs different processing on the message depending on whether the determination result A or B has been outputted or the determination result C has been outputted. As one example, when the determination result A has been outputted in the determination X1 ("A" in step S12), the determination unit 54 performs a normal determination processing that stores the ID of the message, the data included in the message, and the like in the storage unit 52, indicates to the communication processing unit 51 that relay processing is permitted for this message, and the like (step S13).

On the other hand, when the determination unit 54 has outputted the determination result C in the determination X1 ("C" in step S12), as described later, the determination unit 54 performs an indeterminate determination processing that calculates a statistical value for the determination result C and determines whether or not an improper message is present on the vehicle-mounted network 12 based on the calculated statistical value (step S14).

When the determination unit 54 has outputted the determination result B in the determination X1 ("B" in step S12), the determination unit 54 performs an improper determination processing, such as an IPS (Intrusion Prevention System) processing.

In more detail, as the improper determination processing, the determination unit 54 identifies the transmitter of the improper message, resets the vehicle-mounted communication device 111 or control device 122 that has been identified, discards the data included in the improper message, replaces the data with data indicating substitute values, and instructs the communication processing unit 51 to perform relay processing on the message after replacement. As the improper determination processing, as another example, the determination unit 54 notifies, via the communication processing unit 51, a higher-level apparatus located inside or outside the target vehicle 1 that an improper message has been transmitted (step S15).

When a message to be judged has been newly stored in the storage unit 52, the determination unit 54 performs the operations from step S11 onward again.

Note that the determination unit 54 is not limited to a configuration where a measurement result, such as the vehicle speed of the target vehicle 1, indicated by the data included in the message being judged is used for the determination X1. As one example, when the message to be subjected to determination is a periodic message, in the determination X1, the determination unit 54 may be configured to compare the transmission interval of periodic messages with the transmission interval of periodic messages during normal operation.

The detection apparatus that detects improper messages is not limited to a gateway device and may be an apparatus that does not perform relay processing for messages. In this case, the determination unit corresponding to the determination unit 54 in such apparatus may be configured to not perform the normal determination processing (step S13) when the determination result A has been outputted.

Details of Indetermination Determination Processing

Figure 6:
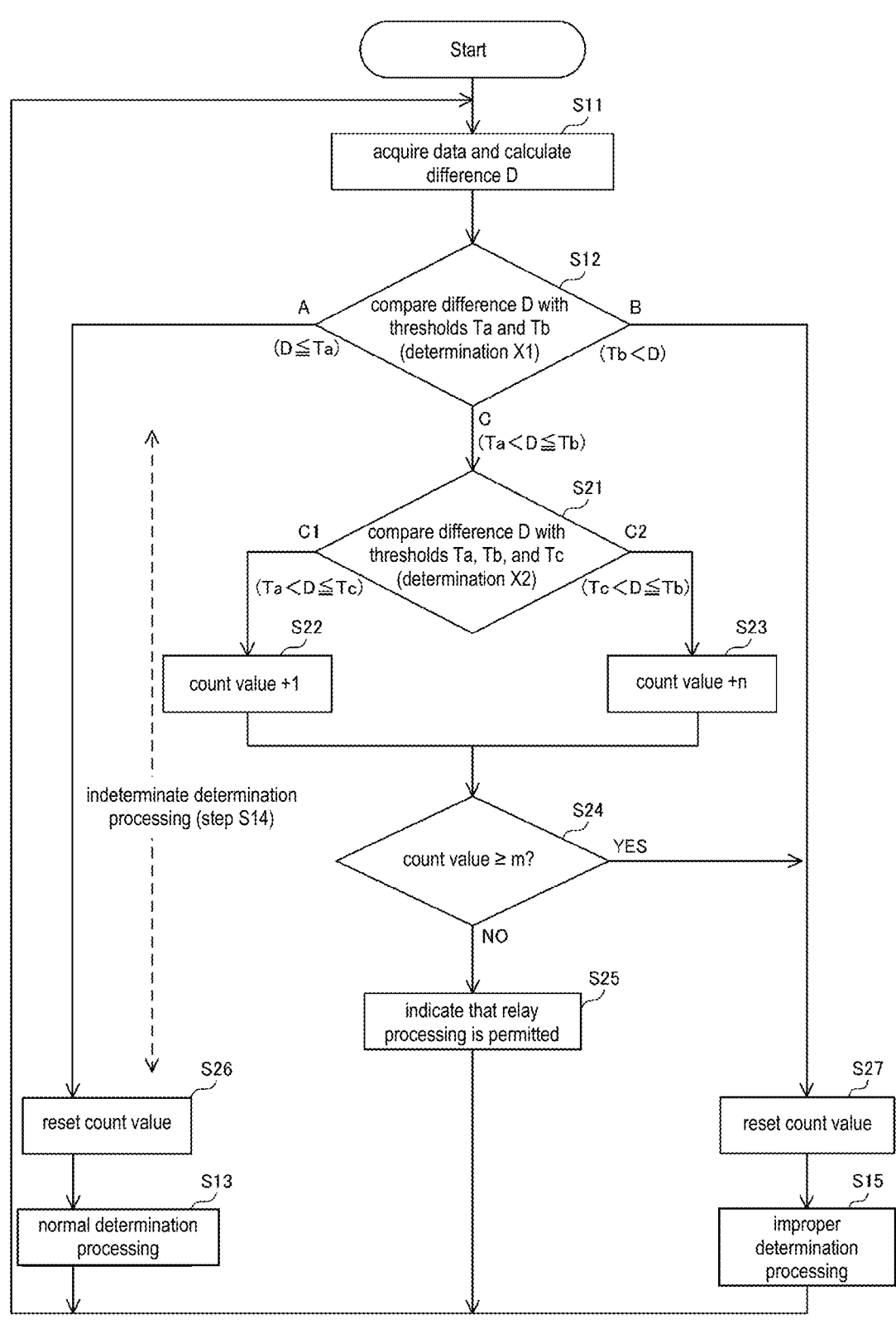
FIG. 6 is a flowchart defining an operation procedure including details of the indeterminate determination processing for determining an improper message by the determination unit in the detection apparatus according to an embodiment of the present disclosure.

FIG. 6 is a flowchart defining an operation procedure including details of the indeterminate determination processing for determining an improper message by the determination unit in the detection apparatus according to an embodiment of the present disclosure. FIG. 6 depicts the details of the indeterminate determination processing (step S14) depicted in FIG. 5, and further includes a plurality of steps compared to FIG. 5.

Here, it is assumed that the storage unit 52 stores a threshold Tc (or "third threshold") in addition to the thresholds Ta and Tb. The relative magnitudes of the thresholds Ta, Tb, and Tc are Ta<Tc<Tb.

As depicted in FIG. 6, when the determination result C has been outputted in the determination X1 ("C" in step S12), the determination unit 54 performs a determination X2 relating to improper messages using the threshold Tc and, in this determination X2, outputs a determination result of a type in keeping with the probability of the message being judged being an improper message.

In more detail, the determination unit 54 performs a determination X2 that compares the difference D calculated in step S11 with the three thresholds Ta, Tb, and Tc stored in the storage unit 52 and outputs a determination result of a type in keeping with the comparison result (step S21).

In more detail, if the calculated difference D is larger than the threshold Ta and equal to or less than the threshold Tc (that is, Ta<D≤Tc), the determination unit 54 outputs a determination result C1 indicating that the message being judged is an indeterminate message with a high probability of being normal. ("C1" in step S21).

If the calculated difference D is larger than the threshold Tc and equal to or less than the threshold Tb (Tc<D≤Tb), the determination unit 54 outputs a determination result C2 indicating that the message being judged is an indeterminate message with a high probability of being an improper message ("C2" in step S21).

Next, the determination unit 54 calculates, as a statistical value for the determination result C, the statistical value of a plurality of iterations of the determination X2. As one example, the determination unit 54 counts, as a statistical value for the determination result C, the number of times the determination result C is outputted, that is, the number of times the determination result C1 or the determination result C2 is outputted by the determination X2.

When doing so, the determination unit 54 changes a countup value depending on the magnitude-based relationships between the difference D and the thresholds Ta, Tb, and Tc. In other words, when calculating the count value, the determination unit 54 performs weighting in keeping with the type of determination result C. That is, the determination unit 54 performs weighting on the countup value in keeping with the type of determination result C.

As one example, when the determination unit 54 has outputted the determination result C1 in the determination X2 ("C1" in step S21), the determination unit 54 increases the count value of the counter 53 by one (step S22).

On the other hand, when the determination unit 54 has outputted the determination result C2 in the determination X2 ("C2" in step S21), the determination unit 54 increases the count value of the counter 53 by n. Here, n is an integer that is equal to or greater than 2 (step S23).

Next, the determination unit 54 determines whether or not the count value is equal to or greater than m. Here, m is larger than the highest value out of the plurality of countup values of the counter 53. In this case, m is an integer that is larger than n, which is the maximum value (step S24).

If the count value is below m ("NO" in step S24), as one example the determination unit 54 instructs the communication processing unit 51 to permit relay processing of the message being judged (step S25).

After this, the determination unit 54 stands by until a message to be judged is newly stored in the storage unit 52. When a message to be judged has been newly stored in the storage unit 52, the determination unit 54 performs the operations from step S11 onward once again.

Next, when the determination unit 54 has outputted the determination result A in the determination X1 of the newly stored message (that is, "A" in step S12), the determination unit 54 resets the count value (step S26) and performs the normal determination processing (step S13).

On the other hand, when the determination unit 54 has outputted the determination result B in the determination X1 of the newly stored message (that is, "B" in step S12), the determination unit 54 resets the count value (step S27) and performs the improper determination processing (step S15).

When the determination unit 54 has outputted the determination result C in the determination X1 of the newly stored message (that is, "C" in step S12), the determination unit 54 performs the operations from step S21 onward again.

In step S24, when the count value is equal to or higher than m ("YES" in step S24), the determination unit 54 determines that an improper message is present on the vehicle-mounted network 12. The determination unit 54 then resets the count value (step S27), and performs the improper determination processing on the most recent message to be judged, for example (step S15).

In this way, by using a configuration where the presence of an improper message is determined when the determination result C has been outputted a plurality of times in succession, it is possible to prevent an erroneous determination relating to improper messages and make more accurate determinations.

Also, by using a configuration that increases the count value by a larger amount when the determination result C2 is outputted compared to when the determination result C1 is outputted, it becomes easier for the outputting of the determination result C2 to produce a determination result that an improper message is present on the network compared to when the determination result C1 is outputted. This makes it possible to make much more accurate determinations. Note that the storage unit 52 is not limited to a configuration that stores the three thresholds Ta, Tb, and Tc, and instead may store two thresholds or four or more thresholds. When four or more thresholds are stored in the storage unit 52, the determination unit 54 can use the four or more thresholds in the determination X2 in step S21 to output three or more types of determination result C1, C2, C3, and so on.

Furthermore, the determination unit 54 is not limited to a configuration in which a count value is calculated as the statistical value of the determination result C based on the number of times the determination results C1 and C2 have been outputted. As a statistical value for the determination result C, the determination unit 54 may for example calculate the ratio of the number of times the determination result C2 has been outputted to the number of iterations of the determination X2.

As a detailed example, the determination unit 54 performs the determination X2 every time the determination result C has been outputted in the determination X1, and when the number of times the determination result C2 has been outputted out of the most recent 10 determination results of the determination X2 is equal to or greater than a predetermined number, determines that an improper message is present on the vehicle-mounted network 12.

Modification 1 of Indeterminate Determination Processing

Referring again to FIG. 5, the determination unit 54 is not limited to a configuration that performs the indeterminate determination processing like that depicted in FIG. 6 when the determination unit 54 has outputted the determination result C in the determination X1, and as one example may use a configuration that generates log data indicating that the determination result C has been outputted as the indeterminate determination processing (step S14).

In this case, as one example, the determination unit 54 stores an indication that the message being judged is an indeterminate message, the ID of the indeterminate message, the data in the message, and the like in the storage unit 52 as log data, and instructs the communication processing unit 51 to permit relay processing of the message.

Modification 2 of Indeterminate Determination Process

Figure 7:
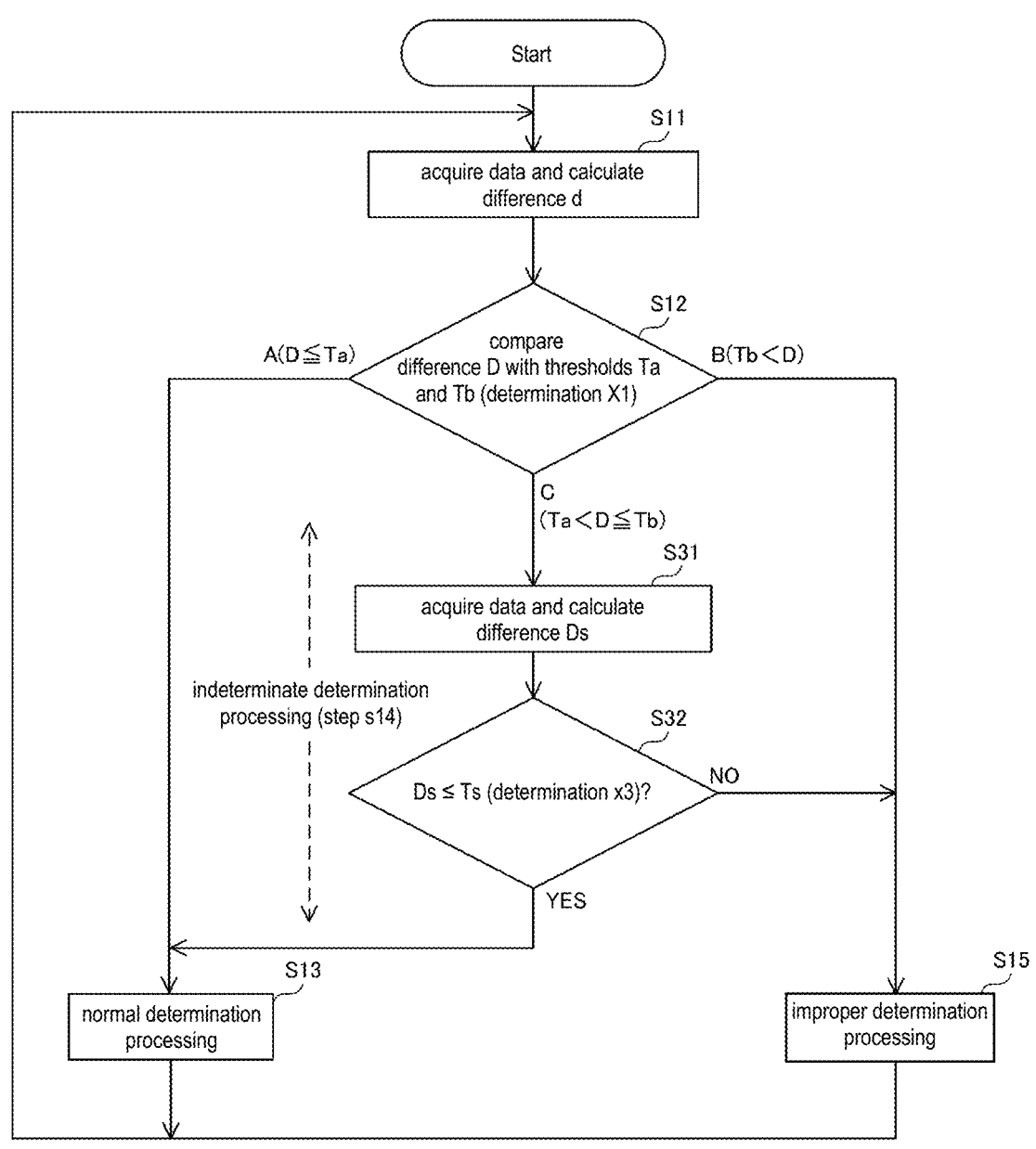
FIG. 7 is a flowchart defining an operation procedure including details of an indeterminate determination processing according to Modification 2, for determinations of improper messages by the determination unit in the detection apparatus according to an embodiment of the present disclosure.

FIG. 7 is a flowchart defining an operation procedure including details of an indeterminate determination processing according to Modification 2, for determinations of improper messages by the determination unit in the detection apparatus according to an embodiment of the present disclosure. FIG. 7 depicts details of the indeterminate determination processing (step S14) depicted in FIG. 5.

As depicted in FIG. 7, when the determination result C has been outputted in the determination X1 ("C" in step S12), the determination unit 54 performs a determination X3, whose content differs to the determination X1, on another message that differs from the message currently being judged and determines whether or not an improper message is present on the vehicle-mounted network 12 based on the determination result of this determination X3.

In more detail, when the determination result C has been outputted in the determination X1 ("C" in step S12), as one example, the determination unit 54 performs the determination X3 on another message including data indicating a measurement result that relates to the target vehicle 1 and is a different type to the data included in the message being judged in the determination X1.

Here, it is assumed that the determination unit 54 performs the determination X1 on a message indicating the vehicle speed and performs the determination X3 on a message indicating the engine rotation speed. It is assumed that detection condition information indicating the engine rotation speed during normal operation and a threshold Ts (or "fourth threshold") of the difference Ds from the engine rotation speed during normal operation is registered in the storage unit 52. As one example, the engine speed during normal operation is the average value of the engine speed when the target vehicle 1 is running during normal operation.

In this case, as one example, the determination unit 54 acquires data included in the message indicating the engine rotation speed out of the plurality of messages stored in the storage unit 52 by the message acquisition unit 55. The determination unit 54 then calculates the difference Ds between the engine rotation speed indicated by the acquired data and the engine rotation speed during normal operation stored in the storage unit 52 (step S31).

Next, the determination unit 54 performs the determination X3 to compare the calculated difference Ds and the threshold Ts stored in the storage unit 52 (step S32).

When the calculated difference Ds is equal to or less than the threshold Ts (that is, Ds≤Ts) ("YES" in step S32), the determination unit 54 determines that no improper message is present on the vehicle-mounted network 12 and performs the normal determination process (step S13).

On the other hand, when the calculated difference Ds is larger than the threshold Ts (that is, Ts<Ds) ("NO" in step S32), the determination unit 54 determines that an improper message is present on the vehicle-mounted network 12 and performs the improper determination processing (Step S15).

Note that the determination unit 54 may be configured to change the determination criterion for the determination X3 (step S32) in keeping with whether or not the measurement result of the vehicle speed satisfies a predetermined condition in the determination X1 (step S12).

Here, when the target vehicle 1 is traveling at high speed, the engine speed is less likely to increase than when the target vehicle 1 is traveling at low speed. For this reason, when the target vehicle 1 is traveling at high speed, the determination unit 54 sets the criterion in the determination X3 for determining that an improper message is present lower compared to when the target vehicle 1 is traveling at low speed.

In more detail, it is assumed that the storage unit 52 stores a vehicle speed P which is a criterion for determining whether or not the target vehicle 1 is traveling at a low speed. When the determination unit 54 has outputted the determination result C in the determination X1 ("C" in step S12), the determination unit 54 compares the vehicle speed indicated by the message being judged with the vehicle speed P stored in the storage unit 52.

When the vehicle speed indicated by the message is equal to or lower than the vehicle speed P, the determination unit 54 determines that the target vehicle 1 is traveling at low speed. On the other hand, when the vehicle speed indicated by the message is higher than the vehicle speed P, the determination unit 54 determines that the target vehicle 1 is traveling at high speed.

When it has been determined that the target vehicle 1 is traveling at high speed, the determination unit 54 uses a threshold Ts1 in the determination X3 as the criterion for determining that an improper message is present. On the other hand, when the determination unit 54 has determined that the target vehicle 1 is traveling at low speed, in determination X3, the determination unit 54 uses a threshold Ts2, which is larger than the threshold Ts1, in the determination X3 as the criterion for determining that an improper message is present.

In more detail, when it has been determined that the target vehicle 1 is traveling at high speed and the difference Ds between the engine rotation speed indicated by the message being judged in the determination X3 and the engine rotation speed during normal operation is equal to or less than the threshold Ts1 (that is, Ds≤Ts1), the determination unit 54 determines that no improper message is present on the vehicle-mounted network 12.

On the other hand, if the determination unit 54 has determined that the target vehicle 1 is traveling at high speed and the difference Ds is larger than the threshold Ts1 (that is, Ts1<Ds), the determination unit 54 determines that an improper message is present on the vehicle-mounted network 12.

If the determination unit 54 has determined that the target vehicle 1 is traveling at low speed and the difference Ds is equal to or less than the threshold Ts2 (that is, Ds≤Ts2), the determination unit 54 determines that no improper message is present on the vehicle-mounted network 12.

On the other hand, if the determination unit 54 has determined that the target vehicle 1 is traveling at high speed and the difference Ds is larger than the threshold Ts2 (that is, Ts2<Ds), the determination unit 54 determines that an improper message is present on the vehicle-mounted network 12.

The type of data used for the determination X1 and the type of data used for the determination X3 may be the same. As one example, the determination unit 54 may subject a message indicating vehicle speed that has been newly stored in the storage unit 52 to the determination X1 and subject a message indicating a past vehicle speed that is stored in the storage unit 52 to the determination X3.

All features of the embodiments disclosed here are exemplary and should not be regarded as limitations on the present disclosure. The scope of the present disclosure is indicated by the range of the patent claims, not the description given above, and is intended to include all changes within the meaning and scope of the patent claims and their equivalents.

The above description also includes the features given in the following supplementary note.

Supplementary Note 1

A detection apparatus for detecting an improper message on a vehicle-mounted network mounted in a vehicle, the detection apparatus including: a message acquisition unit configured to acquire a transmission message on the vehicle-mounted network; and a determination unit configured to perform a determination relating to improper messages on the vehicle-mounted network by performing a determination on the transmission message acquired by the message acquisition unit, wherein the determination unit is capable of outputting a second determination result relating to the transmission message in addition to a first determination result indicating whether or not the transmission message acquired by the message acquisition unit is an improper message, when the second determination result has been outputted, the determination unit performs another determination relating to improper messages and, in the other determination, outputs a determination result of a type in keeping with a probability that the transmission message being judged is an improper message, and the determination unit determines whether or not an improper message is present based on a statistical value of a plurality of iterations of the other determination.

The invention claimed is:

1. A detection apparatus for detecting an improper message on a vehicle-mounted network mounted in a vehicle, the detection apparatus comprising:

a message acquisition unit configured to acquire a transmission message on the vehicle-mounted network; and a determination unit configured to perform a first determination to determine if the transmission message acquired by the message acquisition unit message is one of a normal message, an improper message and an indeterminate message, the indeterminate message being a message that may be classified as either normal or improper, wherein the determination unit is capable of outputting a second determination for each message determined to be indeterminate, wherein the determination unit calculates a statistical value for the determination result to determine if the message is an improper message.

2. The detection apparatus according to claim 1, wherein the determination unit performs respectively different processing relating to the transmission message when the first determination result has been outputted and when the second determination result has been outputted.

3. The detection apparatus according to claim 2, wherein when the second determination result has been outputted, the determination unit generates log data indicating that the second determination result has been outputted.

4. The detection apparatus according to claim 2, wherein when the second determination result has been outputted as a first determination, the determination unit performs a second determination with a different content on another transmission message that differs to the transmission message subjected to the first determination, and determines whether or not an improper message is present based on a determination result of the second determination.

5. The detection apparatus according to claim 4, wherein the transmission message subjected to the first determination and the other transmission message subjected to the second determination indicate different types of measurement result relating to the vehicle.

6. The detection apparatus according to claim 4,
wherein the transmission message subjected to the first determination indicates a measurement result for a vehicle speed of the vehicle, and
the determination unit changes a determination criterion for the second determination in keeping with whether or not the measurement result for the vehicle speed satisfies a predetermined condition.

7. The detection apparatus according to claim 4,
wherein the transmission message that is subjected to the first determination indicates a measurement result for a vehicle speed of the vehicle,
the transmission message that is subjected to the second determination indicates a measurement result for an engine rotation speed of the vehicle,
the detection apparatus further comprises a storage unit for storing a normal engine rotation speed, which is a measurement result of the engine rotation speed during normal operation when no improper message is present, and a fourth threshold that is determined based on the normal engine rotation speed, and
in the second determination, the determination unit compares a difference between a measurement result of the engine rotation speed indicated by the transmission message and the normal engine rotation speed with the fourth threshold.

8. The detection apparatus according to claim 1,
wherein the second determination result includes a plurality of types of determination result, and
the determination unit performs weighting in keeping with the types when calculating the statistical value.

9. The detection apparatus according to claim 1,
wherein the transmission message acquired by the message acquisition unit indicates a measurement result for a vehicle speed of the vehicle,
the detection apparatus further comprises a storage unit for storing a normal vehicle speed, which is a measurement result of vehicle speed during normal operation when no improper message is present, and a first threshold and a second threshold that are in a magnitude-based relationship determined based on the normal vehicle speed, and
the determination unit compares a difference between a measurement result for the vehicle speed indicated by the transmission message and the normal vehicle speed with the first threshold and the second threshold and outputs the first determination result or the second determination result in keeping with a comparison result.

10. The detection apparatus according to claim 9,
wherein the storage unit further stores a third threshold that is larger than the first threshold and smaller than the second threshold,
the determination unit outputs the second determination result when the difference is larger than the first threshold and equal to or less than the second threshold, and
upon outputting the second determination result, the determination unit subjects the transmission message to a determination relating to improper messages using the third threshold stored in the storage unit.

11. The detection apparatus according to claim 10,
wherein the detection apparatus further comprises a counter, and
the determination unit changes a countup value of the counter in keeping with a magnitude-based relationship between the difference and the first threshold, the second threshold, and the third threshold and performs a determination relating to improper messages using a count value of the counter.

12. The detection apparatus according to claim 11,
wherein the determination unit determines that an improper message is present when the count value of the counter is equal to or higher than a predetermined value, and
the predetermined value is larger than a highest value out of a plurality of countup values of the counter.

13. A detection method for a detection apparatus that detects an improper message on a vehicle-mounted network mounted in a vehicle, the detection method comprising:
a step of acquiring a transmission message on the vehicle-mounted network; and
a step of performing a first determination to determine if the transmission message is one of a normal message, an improper message and an indeterminate message, the indeterminate message being a message that may be classified as either normal or improper,
a step of performing a second determination for each transmission message determined to be indeterminate, wherein the second determination is made by calculating a statistical value of the determination result to determine if the transmission message is an improper message.

14. A computer program product used in a detection apparatus that detects an improper message on a vehicle-mounted network mounted in a vehicle, the computer program product comprising a non-transitory, machine-readable medium storing instructions which, when executed by at least one programmable processor, causes at least one programmable processor to perform operations comprising:
acquiring a transmission message on the vehicle-mounted network;
performing a first determination to determine if the transmission message is one of a normal message, an improper message and an indeterminate message, the indeterminate message being a message that may be classified as either normal or improper; and
performing a second determination for each transmission message determined to be indeterminate, wherein the second determination is made by calculating a statistical value of the determination result to determine if the transmission message is an improper message.

* * * * *